(12) United States Patent
Zacks et al.

(10) Patent No.: US 10,938,706 B1
(45) Date of Patent: Mar. 2, 2021

(54) SYSTEMS AND METHODS FOR PROVIDING TRAFFIC GENERATION ON NETWORK DEVICES

(71) Applicant: Cisco Technology, Inc., San Jose, CA (US)

(72) Inventors: David John Zacks, Vancouver (CA); Thomas Szigeti, Vancouver (CA); Hanoch Haim, Tel-Mond (IL); Anoop Vetteth, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/575,015

(22) Filed: Sep. 18, 2019

(51) Int. Cl.
*H04L 12/00* (2006.01)
*H04L 12/26* (2006.01)
*H04L 12/947* (2013.01)

(52) U.S. Cl.
CPC .............. *H04L 43/50* (2013.01); *H04L 43/08* (2013.01); *H04L 49/25* (2013.01)

(58) Field of Classification Search
CPC ....... H04L 63/30; H04L 43/16; H04L 41/046; H04L 29/12066; H04L 43/08; H04L 12/66; H04L 43/12; H04L 69/22; H04L 41/0896; H04L 41/0213; H04W 12/0808; H04W 24/06; H04N 19/97
USPC ................................................. 709/224, 223
See application file for complete search history.

(56) References Cited

U.S. PATENT DOCUMENTS

| | | | | |
|---|---|---|---|---|
| 6,801,940 | B1 * | 10/2004 | Moran ..................... | H04L 47/10 370/230 |
| 7,421,734 | B2 * | 9/2008 | Ormazabal ............. | H04L 63/02 709/224 |
| 7,596,811 | B2 * | 9/2009 | Lloyd ..................... | H04L 43/00 370/230 |
| 7,633,942 | B2 * | 12/2009 | Bearden .............. | H04L 41/0213 370/392 |
| 7,693,082 | B2 | 4/2010 | Wright | |
| 7,711,751 | B2 * | 5/2010 | Kelley .................. | H04L 41/046 707/791 |
| 7,751,421 | B2 * | 7/2010 | Chi ........................ | H04L 43/50 370/429 |

(Continued)

FOREIGN PATENT DOCUMENTS

EP 3364627 A1 8/2018

OTHER PUBLICATIONS

Wong, "An Evaluation of Software-Based Traffic Generators Using Docket," KTH Royal Institute of Technology School of Electrical Engineering and Computer Science, 2018, pp. 1-65.

(Continued)

*Primary Examiner* — Frantz Coby
(74) *Attorney, Agent, or Firm* — Polsinelli PC

(57) ABSTRACT

A method relates to providing arbitrary and custom application traffic generation on network devices. The method includes identifying, via a network controller, an application associated with a network to yield an identified application, spinning up, by the network controller, a traffic generator in a container on a network device, wherein the traffic generator is configured to emulate traffic associated with the network device and the identified application and monitoring performance of at least one of the identified application in the network and the traffic generator on the network device.

17 Claims, 7 Drawing Sheets

(56) References Cited

U.S. PATENT DOCUMENTS

| | | | | |
|---|---|---|---|---|
| 7,908,130 | B2* | 3/2011 | Van Ginkel | H04L 47/10 703/13 |
| 8,116,224 | B2* | 2/2012 | Bugenhagen | H04L 47/74 370/252 |
| 8,125,897 | B2* | 2/2012 | Ray | H04L 41/0896 370/229 |
| 8,213,323 | B1* | 7/2012 | Papagiannaki | H04L 43/16 370/246 |
| 8,687,483 | B2* | 4/2014 | Hutchison | H04L 43/50 370/229 |
| 8,818,188 | B2 | 8/2014 | Elhage | |
| 8,825,820 | B2* | 9/2014 | Gerber | H04L 43/08 709/223 |
| 8,849,965 | B2* | 9/2014 | Gonia | H04W 24/06 709/220 |
| 9,240,906 | B2* | 1/2016 | Edwards | H04L 12/66 |
| 9,276,774 | B2 | 3/2016 | Manser | |
| 9,300,560 | B2* | 3/2016 | Leighton | H04L 29/12066 |
| 9,565,076 | B2* | 2/2017 | Degioanni | H04L 63/30 |
| 9,838,292 | B2* | 12/2017 | Polychronis | H04L 69/22 |
| 10,277,516 | B2 | 4/2019 | Price et al. | |
| 2003/0088664 | A1* | 5/2003 | Hannel | H04L 29/06 709/224 |
| 2004/0127212 | A1* | 7/2004 | Wang | H04L 43/50 455/423 |
| 2013/0145436 | A1* | 6/2013 | Wiley | H04W 12/0808 726/4 |
| 2013/0197790 | A1* | 8/2013 | Ouali | H04N 19/97 701/118 |
| 2018/0054377 | A1* | 2/2018 | Polychronis | H04L 43/12 |
| 2019/0034313 | A1 | 1/2019 | Vedurumudi et al. | |

OTHER PUBLICATIONS

International Search Report and Written Opinion from the International Searching Authority, dated Nov. 25, 2020, 13 pages, for corresponding International Patent Application No. PCT/US2020/050893.

Fujdiak, Radek, et al., "IP traffic generator using container virtualization technology," 2018 10$^{th}$ International Congress on Ultra Modern Telecommunications and Control Systems and Workshops (ICUMT), 2018 IEEE, 6 pages.

Konstrantynowicz, M., et al., "NFV Service Density Benchmarking," draft-mkonstan-nf-service-density-00, Benchmarking Working Group, Mar. 11, 2019, pp. 1-.

Moradi, Farnaz, et al., "ConMon: an Automated Container Based Network Performance Monitoring System," 2017 IFIP/IEEE Symposium on Integrated Network and Service Management (IM), May 8, 2017, pp. 54-62.

* cited by examiner

SYSTEMS AND METHODS FOR PROVIDING TRAFFIC GENERATION ON NETWORK DEVICES

TECHNICAL FIELD

The subject matter of this disclosure relates to providing arbitrary and custom application traffic generation on network devices leveraging a containerized version of a traffic generation code base.

BACKGROUND

Today's enterprise networks have thousands of applications running across them and the performance of these applications is a primary concern for chief information officers. Often the network itself is merely a means to an end for most of the CIOs.

It can be difficult to determine or evaluate how a particular application is going to perform once it is deployed. It is also difficult in these complicated environments to model or test application performance once the application is deployed and running.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
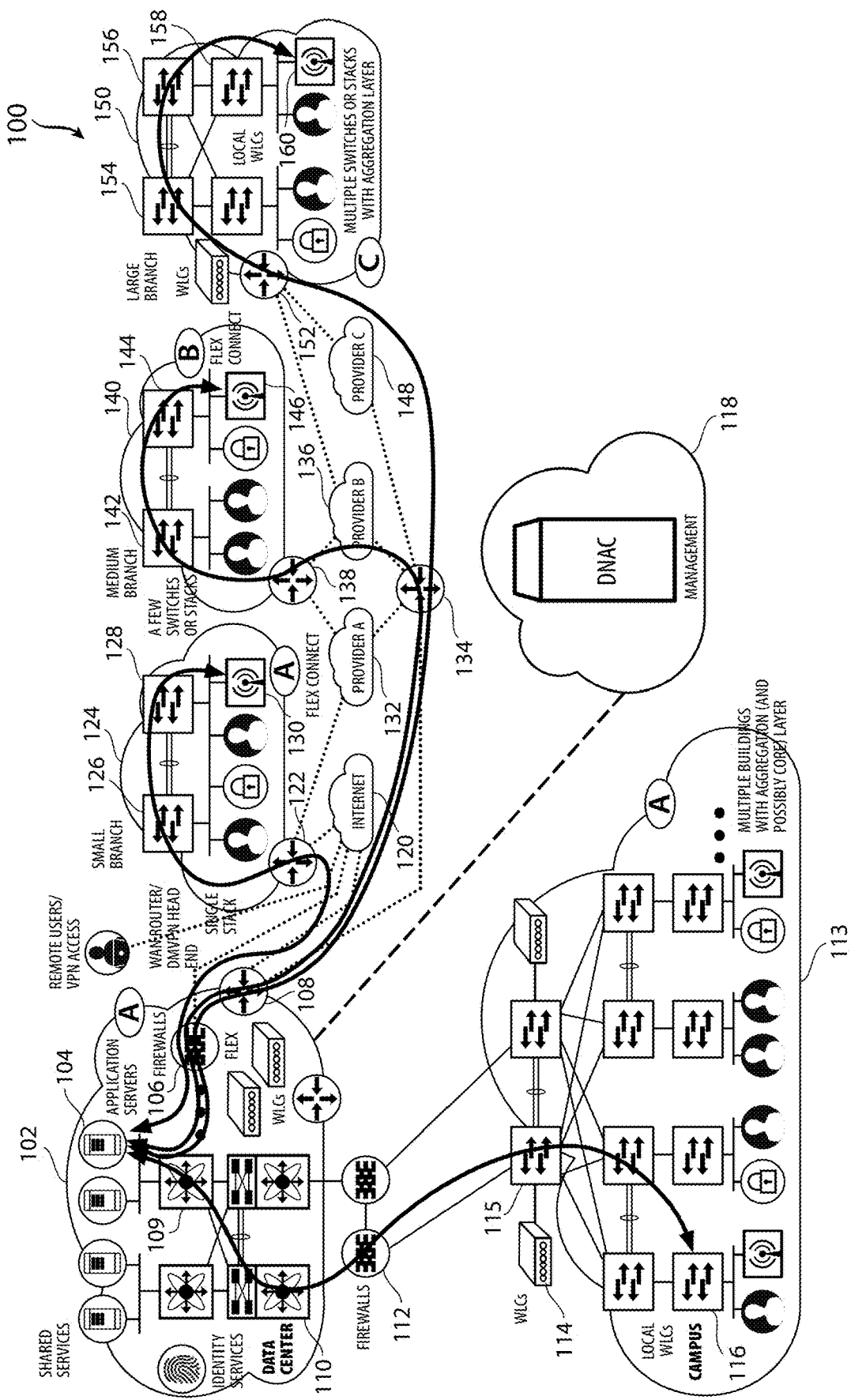
FIG. 1 illustrates a topology of a network in which the innovation disclosed herein can apply.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The present disclosure provides solutions to the issues raised above with respect to application performance both in terms of modeling and testing applications to be deployed as well as providing data for applications that are deployed. The modeling and monitoring typically relates to how data flows through a network to and from a particular application. A network manager needs a flexible, extensible and scalable method to proactively test, monitor and report application performance across a network infrastructure. The present disclosure encompasses the ability to provide arbitrary and custom traffic generation and analysis from a network device using a containerized infrastructure and on device performance optimized interfaces. An example network device is an edge node on a network, a switch or a router. These network devices typically just receive and transmit packets of data as a node on the network. This disclosure provides an approach of positioning a containerized traffic generator right on a network device.

An example method includes identifying, via a network controller, an application associated with a network to yield an identified application, spinning up, by the network controller, a traffic generator in a container on a network device, wherein the traffic generator is configured to emulate traffic associated with the network device and the identified application and monitoring performance of at least one of the identified application in the network and the traffic generator on the network device. The traffic generator in the container on the network device can include a full-function traffic generator and replay engine. The network device can be one of a network switch, an access-layer switch, an edge device or can be some other network device hardware or a virtual device. In one aspect, the traffic generator can include a stateful and stateless traffic generator. The identified application associated with the network can be one of (1) a future application to be deployed and (2) an existing application on the network.

The monitoring of the performance can include monitoring the performance of the identified application prior to deployment to test one or more of a quality of service associated with the identified application and performance routing associated with the identified application. Spinning up the traffic generator in a container further can include interfacing the traffic generator in the container to an underlying network device ASIC (application-specific integrated circuit) infrastructure by utilizing a KR port and dedicated on-network-device resources for one or more of a CPU (central processing unit), a memory and a storage.

The traffic generator can be spun-up and deployed based on a chosen application template from a plurality of predetermined known application templates. The chosen application template can have characteristics associated with the identified application. When the identified application does not have a corresponding signature in a database of application signatures, the method can include defining a new application signature associated with the identified application, deploying the traffic generator with the new application signature and testing traffic flow associated with the identified application by running the traffic generator.

DESCRIPTION OF EXAMPLE EMBODIMENTS

Disclosed herein are systems, methods, and computer-readable media for innovations which focus on the ability to improve the arbitrary and custom traffic generation deployed on network devices in a containerized fashion. An example traffic generator is disclosed herein can be a containerized version of what is called the TRex code base, which is a lightweight and highly scalable stateful and stateless traffic generator that generates Layer 4-7 traffic based on preprocessing and smart replay of real traffic samples and templates. The TRex stateless functionality includes support for multiple streams, the ability to change any packet field and provides per stream statistics for network latency and jitter. The code base can be used to test the efficiency of various network technologies set such as the Cisco Network Based Application Recognition (NBAR2) technologies. These technologies can recognize currently over 1400 applications all of which can be accurately simulated by the traffic generator.

When the identified application does not have a corresponding signature in a database of application signatures, the method can include defining a new application signature associated with the identified application, deploying the traffic generator with the new application signature and testing traffic flow associated with the identified application by running the traffic generator.

Any traffic generation technology can apply to the concepts disclosed herein for containerizing and deploying a traffic generator on a network component.

The traffic generator, as a container-based application, can be capable of operating on various network devices such as, by way of example, the Catalyst 9300 and 9400 platforms running IOS-XE, which is able to host one or more emulated wired clients operating as sensors. IOX-XE is an example operating system that is a combination of a linux kernel and a (monolithic) application that runs on top of the kernel. One example is the Cisco IOS XE Open Service Containers. A service container is an application it can be hosted directly on a Cisco IOX XE routing platform. The application can use the linux aspect of the IOS XE operating system to host both linux virtual containers and kernel virtual machines on various routers. An open service container can carry a digital signature that verifies it as an authentic application from a certain provider.

Generally speaking, a container is an isolated execution environment on a linux host that behaves much like a full featured linux installation with its own users, file system, processes and network stack. Running an application inside of the container isolates it from the host and other containers which means that even when the application inside of them are running, they cannot access or modify the files, processes, users or other resources of the host or other containers. In one aspect of the present disclosure, the concepts herein leverage a containerized version of a traffic generator. In other words, a traffic generator can be deployed on a network device such as an access layer switch within a container and can thereby be used to emulate packet flow and report on the impact of the packet flow back to a network controller.

In emulated wired client will virtually emulate in all respects and actual physical wired client that is physically attached to a front panel port of the switch of the network device. The emulation of wired client behavior can include client authentications (802.1x), DHCP (dynamic host configuration protocol) and DNS (domain name system) operations, and the performance of various tests for connectivity and performance. The emulated client can be used for a variety of tests that are valuable to a network administrator such as testing onboarding, operation, and throughput without having to go through the expense or hassle and overhead of attaching a physical client to the switch.

The configurations and capability provided by the traffic generator or wired sensor will emulate actual client endpoints and ensure that the configuration behavior of the emulated client agents mirror that of endpoints attached to a physical port. For example, each emulated agent running inside the on-switch IOX-based container will have its own IP address and MAC address and the emulated port within the switch to which the wired client sensor is attached will have the exact same configuration, behavior, client base and capabilities as a physical front panel port on the hosting switch.

The traffic generator running inside of a container can be provided with its own dedicated memory and CPU resources on which to run. The traffic generator can be upgraded to provide new functionality or to fix bugs independent of the operating system version on which they run thus minimizing or illuminating the need for a code upgrade for new features or functionality. By operating in a container, sensor probes can emulate a complete wired client and can exercise functionality within the host platform and with other network devices in exactly the same way as a physical client would. This can provide an excellent simulation of actual client experience while eliminating the cost and complexity that would otherwise be associated with hardware-based client deployments. The present disclosure focuses on the use of a network controller such as, by way of example, a Cisco Digital Network Architecture Center (DNAC) to manage, deploy and spin up the containerized traffic generators wherever they may be deployed in the network to achieve the traffic generation and analysis goals.

FIG. 1 illustrates one aspect of this disclosure within a network environment 100. The focus of this disclosure relates to the hosting of a containerized application for traffic generation within a network device and thus this focus relates to the traffic generator placement and thereby its use within the network device. The capability of hosting a traffic generator on the network device can be orchestrated by a network controller for system-wide deployment and analysis. Orchestrating the deployment and analysis of traffic generators on network devices can drive outcomes that are directly consumable by a network manager and enable a new level of functionality not previously available generally within the field of traffic generation.

The approach that will be described herein can include aspects related to on-premises enterprise networks, deployed applications, as well as cloud-based systems and evaluation of potential network impact of applications to be deployed. Thus, what shall be the describes a process of embedding a full function traffic generator and replay engine within a hosted application such as a container on a switch (or other network device) as well as providing for the centralized orchestration and control via a network controller 118 for both enterprise (FIG. 1) and cloud network (FIG. 2) deployments. The approach described herein can also provide system-wide testing, network analysis and troubleshooting both an enterprise and in a cloud based system deployment.

FIG. 1 illustrates various components in a network 100. For example, a data center 102 includes various shared services 104, a switch 109, a firewall 106. WAN router 108, another switch 110, a firewall 112, a wireless local area network controller 114, a switch 115, an example campus network 113, a local wireless area network controller 116 and application server 104 is seen as communicating data through the switch 110, the firewall 112, and the switch 115 to a local wireless area network controller 116. A network controller 118 is illustrated which communicates with the data center 102. The network controller 118 may also communicate with any other component shown within FIG. 1 or FIG. 2 to deploy traffic generators or to transmit/receive data.

The application on the application server 104 can communicate with various other components. For example, the application can communicate via network 120 and the router 122 to a network 124 that has switches 126, 128 and an end point 130. The application on application server 104 can communicate through a router 134 also to a second network 140 through a network provider 136, another router 138, through switch is 142, 144 to end point 146. The application on application server 104 can also communicate via another provider 148 through a network router 152, networks switches 154, 156, 158, a network router 152 and to end point 160.

These various routes illustrate examples of how an application may communicate with other applications or devices through various network components. In one aspect, the network controller 118 can be used to enable an operator to identify a critical application, such as an application running an application server 104, and tag the application is a favorite or with some kind of label as part of an analysis or an application policy workflow study.

The network operator can utilize the network controller 118 to spin up one or more traffic generators to be deployed as a containerized application which hosts the traffic generation capability on a network device such as a network switch. For example, a traffic generator might be deployed in an IOS XE container on a network edge device such as a switch for a router. The network controller 118 can also deploy a corresponding containerized application located within a data center 102 or at the Internet edge to serve as a target component for traffic generation. In other words, each of the network devices disclosed in FIG. 1 could receive a spun up traffic generation component that is containerized and configured on the respective device and/or a corresponding containerized application which can serve as a target for the traffic generation. These various containerized applications can then simulate traffic flow as described herein according to an application template or signature for a particular application such that the system can proactively monitor the performance of either a data center application server 104 or the performance at the Internet edge such as at a router 108. The results can be reported, aggregated and visualized within the network controller 118. Traffic can be generated to flow between the traffic generator and a target component configured at particular positions within the network.

While the network controller 118 is shown as communicating only with the data center 102, this disclosure also contemplates the ability of the network controller 118 being able to deploy containerized traffic generators or corresponding containerized applications in other network environments (i.e., networks 113, 124, 140, 150) besides just the enterprise data center 102 associated with the network controller 118. The network controller can also deploy target components in a containerized manner on any network device in the various networks.

Figure 2:
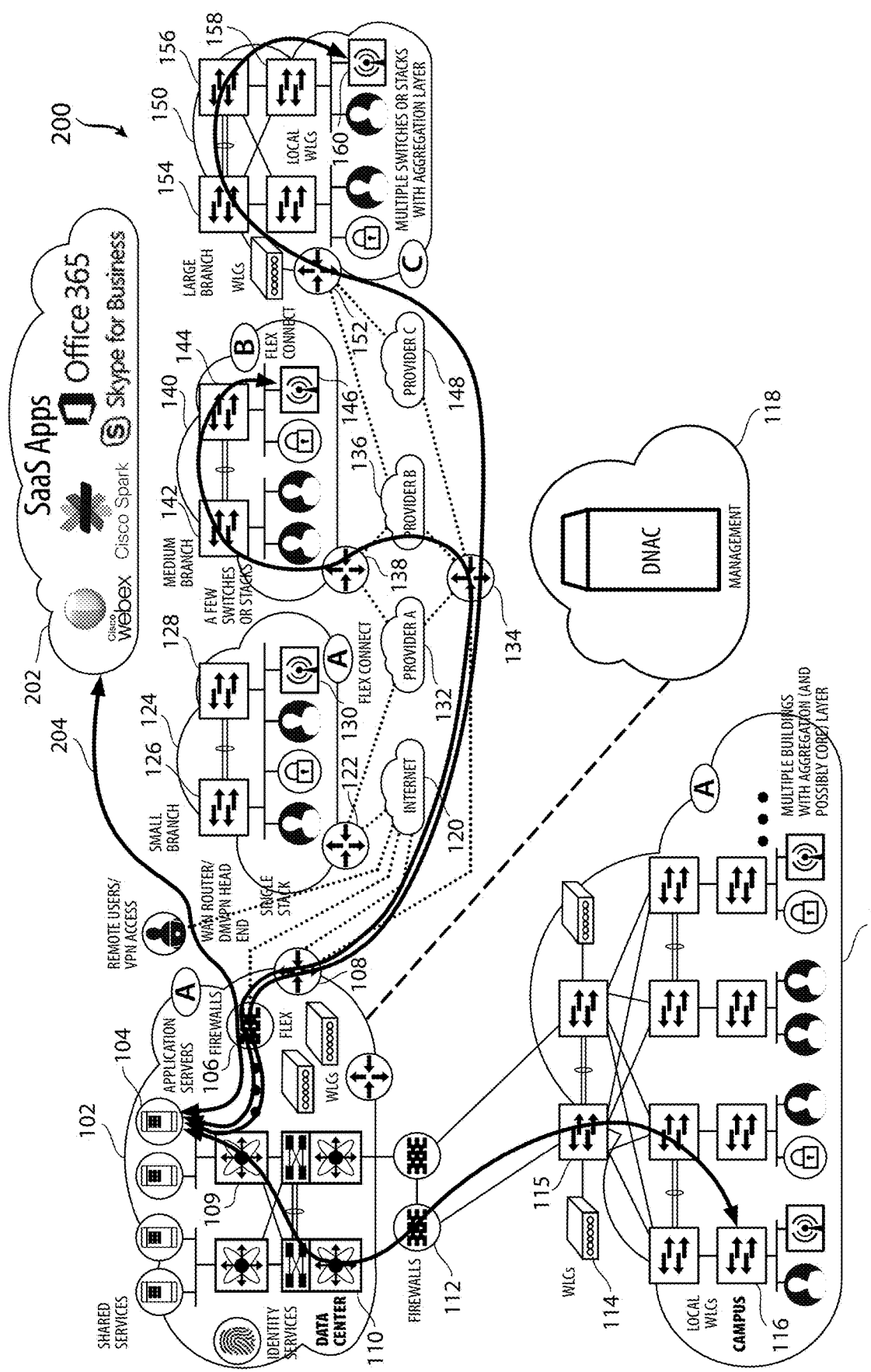
FIG. 2 illustrates another network topology.

In this scenario, there is flexibility that is made available by the containerized traffic generator which allows for the stimulation and use of customized applications, which can be applications are unique to a given customer environment or deployment. The traffic generation tool set provides a great deal flexibility in terms of traffic generation and handling. FIG. 2 illustrates a cloud-based applications approach. The ability to combine these capabilities with the measured metrics of cloud-based applications allows the network operator to gain greater insight into how their applications or performing both in on-premises data centers 102 as well as in the virtual applications hosted within the cloud (vPC or Saas) as illustrated in the network 200 of FIG. 2.

In FIG. 2, communication 204 between the data center 102 and cloud-based apps 202 is shown. In this case, the network controller 118 can proactively monitor the performance of either the data center app servers 104 to a container in the data center or the Internet edge and combine these results with cloud monitoring performance metrics which can be received at the network controller 118. In general, this disclosure provides an important extension to the on-switch hosted-app wired client sensor capability as outlined above and provides a flexible method of emulating additional and custom applications, using and leveraging the basic infrastructure to be able to host an emulated client on the switch.

This disclosure provides the ability to host a traffic generator application within a containerized environment and on a switch. The traffic generator can act as a powerful and flexible traffic generation, analysis, and replay tool. The traffic generation application can leverage the infrastructure and build upon the capabilities of an emulated wired client sensor. This disclosure provides novel capabilities to test a wide variety of functions and significantly enhances both the capability as well as the speed and responsiveness available for an enterprise customer for a variety of tasks, including troubleshooting, as well as network and application analysis.

Since this traffic generation, analysis and replay capability is hosted as an application on a switch, separate from the base operating system code, it can both be deployed rapidly and on demand, and even to geographically remote locations. The traffic generator can also be upgraded separately from the operating system of the switch or network device which hosts the embedded application and provides for deployment flexibility and the elimination of the need for operating system code upgrades to obtain new traffic generation, analysis, and replay functionality. Accordingly, part of this disclosure relates to updating a containerized traffic generator operating on the network device independent of an operating system of the network device. The data path used between the traffic generation application and the switch data plane can also be optimized inasmuch as it is being developed and deployed for the first time and the hosted application is provided with its own CPU and memory resources, such that deploying a traffic generator in a containerized manner as disclosed herein will not unduly impact the control plane performance of the switch. This can be an important consideration for any customer wishing to deploy such an application.

Using the principles disclosed herein, prior to rolling out a new application, the network treatment of the brand-new application can be proactively tested to ensure that all of the requisite policies for quality of service and/or performance routing are in place in an end-to-end manner across the network. Additionally, business-critical applications can be actively monitored on an ongoing basis from any and all edges of the network to the application servers. Finally, when troubleshooting an application issue, on-demand traffic generators can be spun up on any network device to emulate the flow. Target components can also be spun up and deployed across the network. The system may use prebuilt signatures of known existing applications which can be leveraged to simulate traffic generation or the system might be able to define and test unknown or custom applications, whether cloud-based or not, on an on-demand basis.

Figure 3:
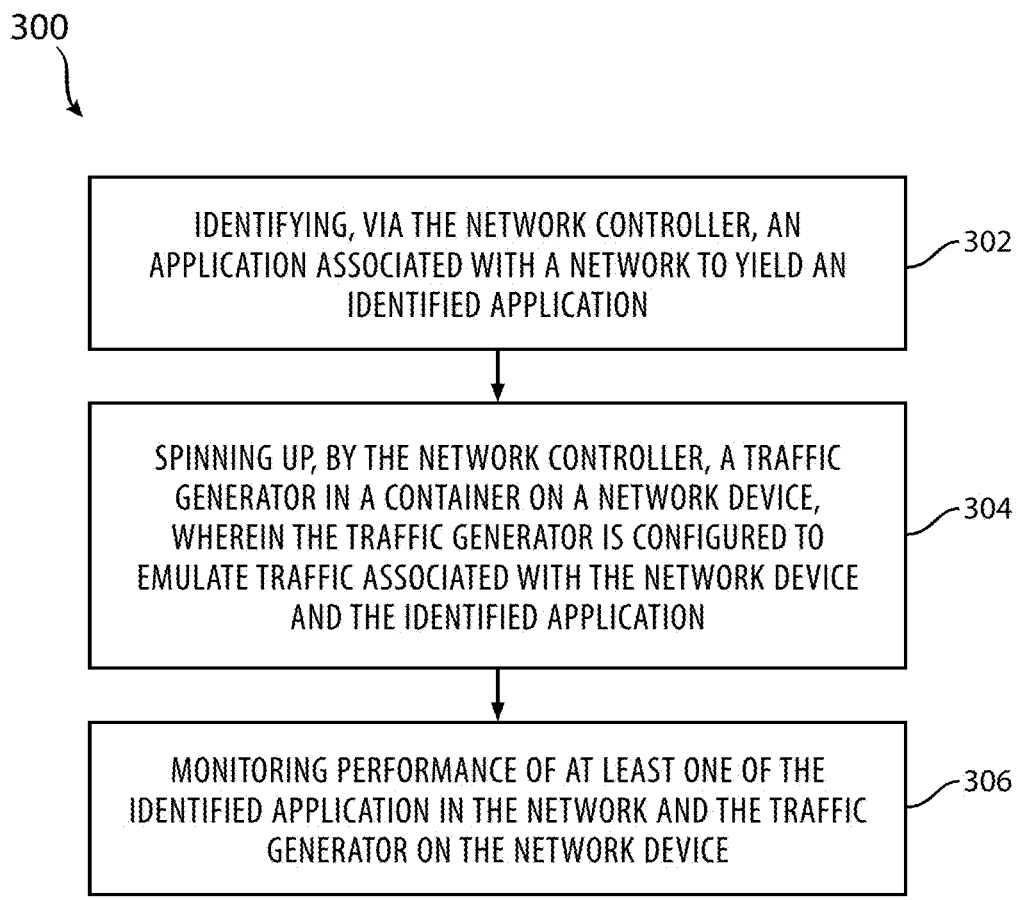
FIG. 3 illustrates a method embodiment from the standpoint of a central controller.

FIG. 3 illustrates a method example of this disclosure from the standpoint of a network controller 118. An example method includes identifying, via the network controller, an application associated with a network to yield an identified application (302), spinning up, by the network controller, a traffic generator in a container on a network device, wherein the traffic generator is configured to emulate traffic associated with the network device and the identified application (304) and monitoring performance of at least one of the identified application in the network and the traffic generator on the network device (306). The traffic generator in the container on the network device can include a full-function traffic generator and replay engine. The network device can be one of a network switch, an access-layer switch, an edge device or can be some other network device hardware or a virtual device. In one aspect, the traffic generator can include a stateful and stateless traffic generator. The identified application associated with the network can be one of (1) a future application to be deployed and (2) an existing application on the network. The method may also include spinning up and deploying a target application on a network device that receives the data generated by the traffic generator.

The monitoring of the performance can include monitoring the performance of the identified application prior to deployment to test one or more of a quality of service associated with the identified application and performance routing associated with the identified application. Spinning up the traffic generator in a container further can include interfacing the traffic generator in the container to an underlying network device ASIC (application-specific integrated circuit) infrastructure by utilizing a KR port and dedicated on-network-device resources for one or more of a CPU (central processing unit), a memory and a storage.

The traffic generator can be spun-up and deployed based on a chosen application template from a plurality of predetermined known application templates. The chosen application template can have characteristics associated with the identified application. When the identified application does not have a corresponding signature in a database of application signatures, the method can include defining a new application signature associated with the identified application, deploying the traffic generator with the new application signature and testing traffic flow associated with the identified application by running the traffic generator.

Figure 4:
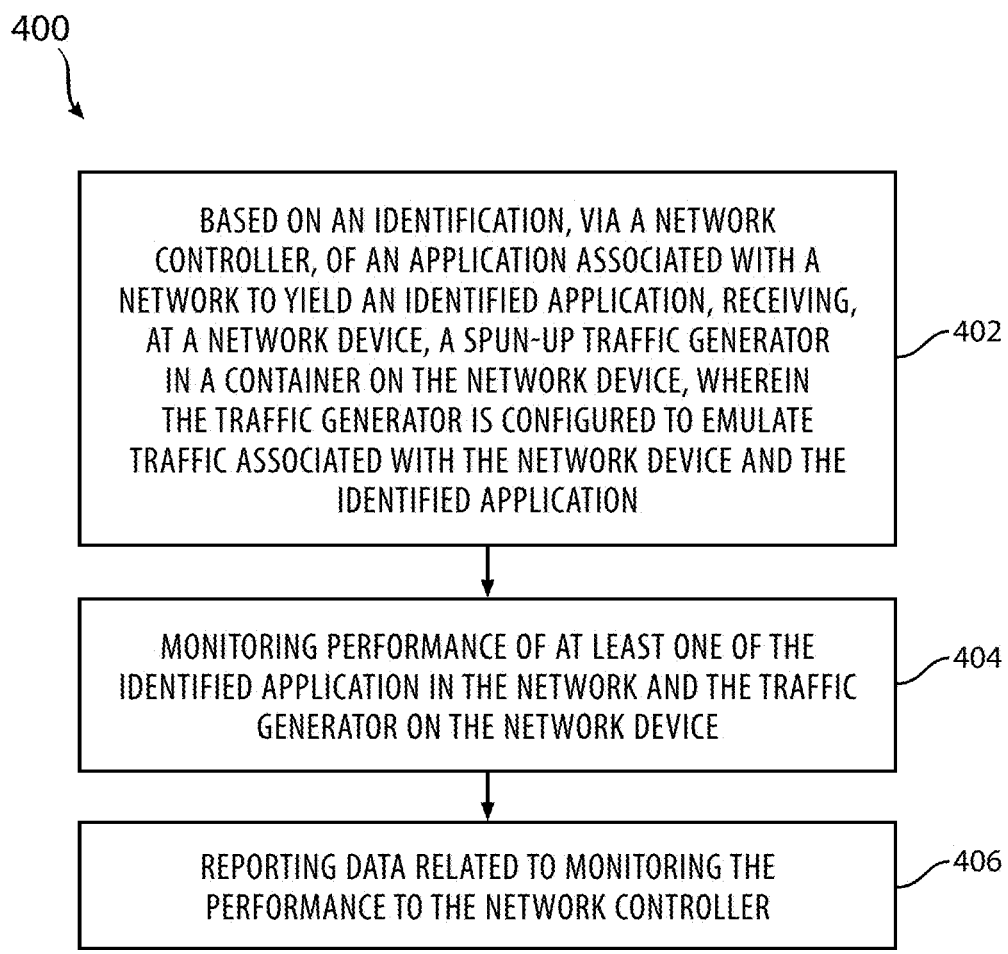
FIG. 4 illustrates a method embodiment from the standpoint of a network device.

FIG. 4 illustrates an example method from the standpoint of any network device that receives a deployed traffic generator. An example method includes based on an identification, via a network controller, of an application associated with a network to yield an identified application, receiving, at a network device, a spun-up traffic generator in a container on the network device, wherein the traffic generator is configured to emulate traffic associated with the network device and the identified application (402), monitoring performance of at least one of the identified application in the network and the traffic generator on the network device (404) and reporting data related to monitoring the performance to the network controller (406). The traffic generator in the container on the network device can include a full-function traffic generator and replay engine. The network device can be one of a network switch, an access-layer switch, an edge device or can be some other network device hardware or a virtual device. In one aspect, the traffic generator can include a stateful and stateless traffic generator. The identified application associated with the network can be one of (1) a future application to be deployed and (2) an existing application on the network.

Figure 5:
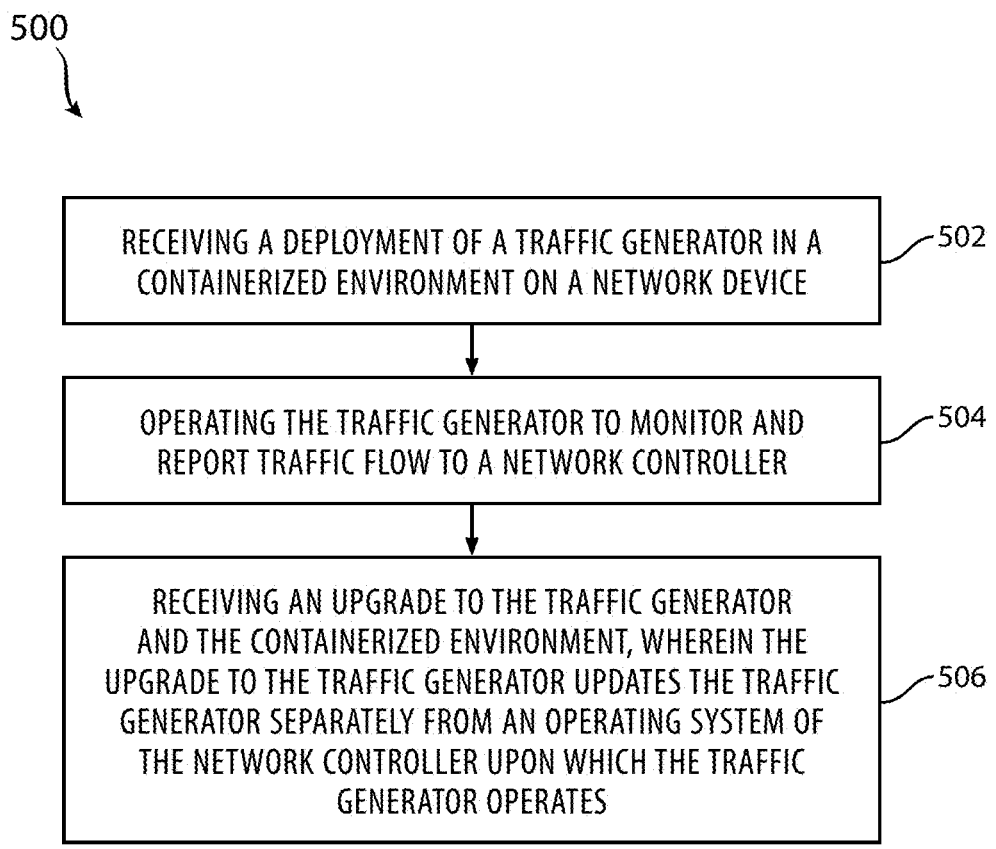
FIG. 5 illustrates a method embodiment from the standpoint of a network switch.

FIG. 5 illustrates an example method related to updating a traffic generator that is containerized on a network device. The method includes receiving a deployment of a traffic generator in a containerized environment on a network device (502), operating the traffic generator to monitor and report traffic flow to a network controller (504), and receiving an upgrade to the traffic generator and the containerized environment, wherein the upgrade to the traffic generator updates the traffic generator separately from an operating system of the network controller upon which the traffic generator operates (506).

Figure 6:
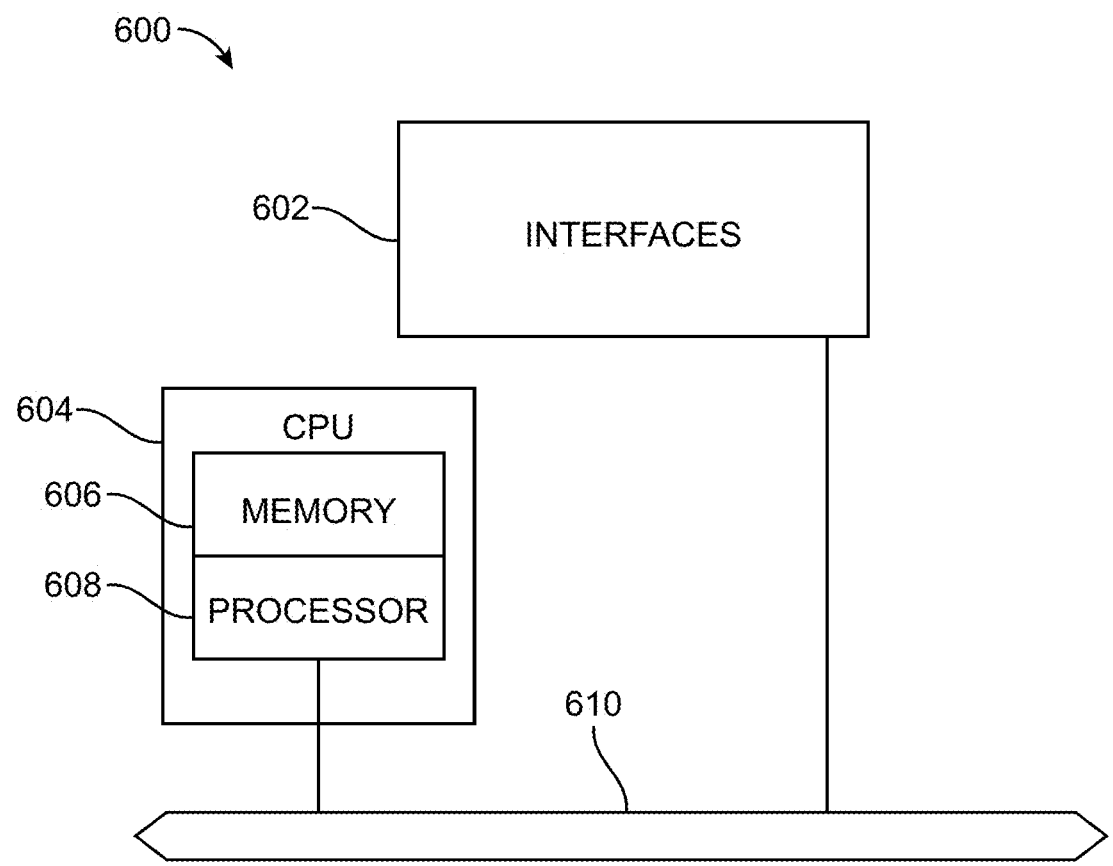
FIG. 6 illustrates an example network device in accordance with various examples.

FIG. 6 illustrates an example network device 600 suitable for implementing aspects of this disclosure. In some examples, the control plane 310 and/or the component 318 may be implemented according to the configuration of the network device 600. The network device 600 includes a central processing unit (CPU) 604, interfaces 602, and a connection 610 (e.g., a PCI bus). When acting under the control of appropriate software or firmware, the CPU 604 is responsible for executing packet management, error detection, and/or routing functions. The CPU 604 preferably accomplishes all these functions under the control of software including an operating system and any appropriate applications software. The CPU 604 may include one or more processors 608, such as a processor from the INTEL X86 family of microprocessors. In some cases, processor 608 can be specially designed hardware for controlling the operations of the network device 600. In some cases, a memory 606 (e.g., non-volatile RAM, ROM, etc.) also forms part of the CPU 604. However, there are many different ways in which memory could be coupled to the system.

The interfaces 602 are typically provided as modular interface cards (sometimes referred to as "line cards"). Generally, they control the sending and receiving of data packets over the network and sometimes support other peripherals used with the network device 600. Among the interfaces that may be provided are Ethernet interfaces, frame relay interfaces, cable interfaces. DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces. FDDI interfaces, WiFi interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the CPU 604 to efficiently perform routing computations, network diagnostics, security functions, etc.

Although the system shown in FIG. 6 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 600.

Regardless of the network device's configuration, it may employ one or more memories or memory modules (including memory 606) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. The memory 606 could also hold various software containers and virtualized execution environments and data.

The network device 600 can also include an application-specific integrated circuit (ASIC), which can be configured to perform routing and/or switching operations. The ASIC can communicate with other components in the network device 600 via the connection 610, to exchange data and signals and coordinate various types of operations by the network device 600, such as routing, switching, and/or data storage operations, for example.

Figure 7:
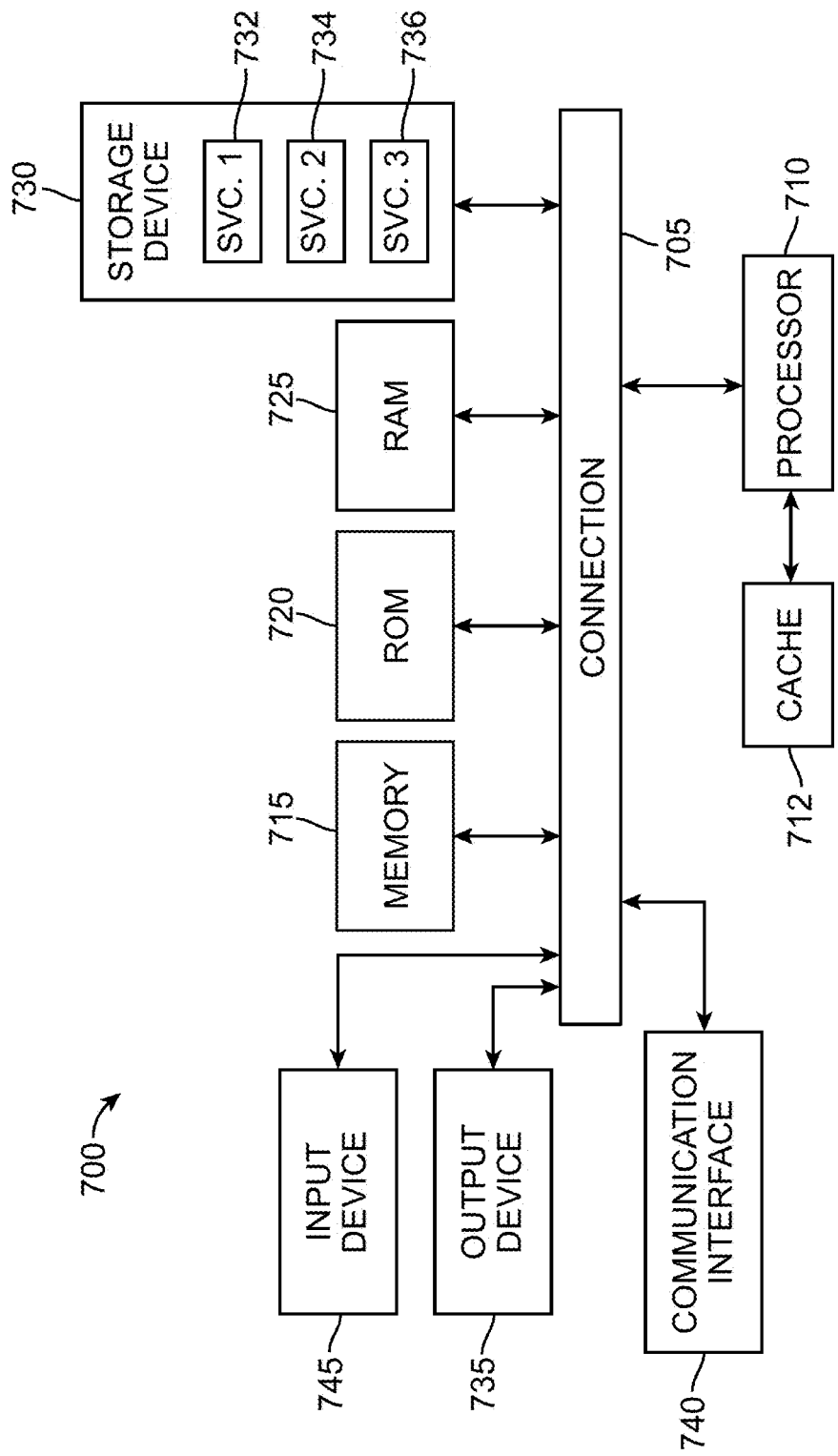
FIG. 7 illustrates an example computing device architecture, in accordance with some examples.

FIG. 7 illustrates an example computing device architecture 700 of an example computing device which can implement the various techniques described herein. The components of the computing device architecture 700 are shown in electrical communication with each other using a connection 705, such as a bus. The example computing device architecture 700 includes a processing unit (CPU or processor) 710 and a computing device connection 705 that couples various computing device components including the computing device memory 715, such as read only memory (ROM) 720 and random access memory (RAM) 725, to the processor 710.

The computing device architecture 700 can include a cache of high-speed memory connected directly with, in close proximity to, or integrated as part of the processor 710. The computing device architecture 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other computing device memory 715 may be available for use as well. The memory 715 can include multiple different types of memory with different performance characteristics. The processor 710 can include any general purpose processor and a hardware or software service, such as service 1 732, service 2 734, and service 3 736 stored in storage device 730, configured to control the processor 710 as well as a special-purpose processor where software instructions are incorporated into the processor design. The processor 710 may be a self-contained system, containing multiple cores or processors, a bus, memory controller, cache, etc. A multi-core processor may be symmetric or asymmetric.

To enable user interaction with the computing device architecture 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art, such as a display, projector, television, speaker device, etc. In some instances, multimodal computing devices can enable a user to provide multiple types of input to communicate with the computing device architecture 700. The communications interface 740 can generally govern and manage the user input and computing device output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof. The storage device 730 can include services 732, 734, 736 for controlling the processor 710. Other hardware or software modules are contemplated. The storage device 730 can be connected to the computing device connection 705. In one aspect, a hardware module that performs a particular function can include the software component stored in a computer-readable medium in connection with the necessary hardware components, such as the processor 710, connection 705, output device 735, and so forth, to carry out the function.

For clarity of explanation, in some instances the present technology may be presented as including individual functional blocks including functional blocks including devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
   identifying, via a network controller, an application associated with a network to yield an identified application;
   spinning up, by the network controller, a new traffic generator in a virtual container on a network device, wherein spinning up the new traffic generator in the virtual container further comprises interfacing the new traffic generator in the virtual container to an underlying network device ASIC infrastructure by utilizing a KR port and dedicated on-network-device resources for one or more of a CPU, a memory and a storage, wherein the new traffic generator is configured to simulate traffic generated by the identified application and associated with the network device;
   monitoring performance of at least one of the identified application in the network and the new traffic generator on the network device, wherein the monitoring of the performance comprises monitoring the performance of the identified application prior to deployment to test one or more of a quality of service associated with the identified application and performance routing associated with the identified application.

2. The method of claim 1, wherein the new traffic generator in the virtual container on the network device comprises a full-function traffic generator and replay engine.

3. The method of claim 1, wherein the network device comprises one of a network switch and an edge device.

4. The method of claim 1, wherein the new traffic generator comprises a stateful and stateless traffic generator.

5. The method of claim 1, wherein the identified application associated with the network is one of (1) a future application to be deployed and (2) an existing application on the network.

6. The method of claim 3, wherein the network device comprises an access-layer switch.

7. The method of claim 1, wherein the new traffic generator is spun-up and deployed based on a chosen application template from a plurality of predetermined known application templates, wherein the chosen application template has characteristics associated with the identified application.

8. The method of claim 1, wherein when the identified application does not have a corresponding signature in a database of application signatures, the method further comprises:
   defining a new application signature associated with the identified application; deploying the new traffic generator with the new application signature; and
   testing traffic flow associated with the identified application by running the new traffic generator.

9. A network controller, the network controller comprising:
   a processor; and
   a computer-readable storage device storing instructions which, when executed by the processor, causes the processor to perform operations comprising:
      identifying an application associated with a network to yield an identified application;
      spinning up a new traffic generator in a virtual container on a network device, wherein spinning up the new traffic generator in the virtual container further comprises interfacing the new traffic generator in the virtual container to an underlying network device ASIC infrastructure by utilizing a KR port and dedicated on-network-device resources for one or more of a CPU, a memory and a storage and wherein the new traffic generator is configured to simulate traffic associated with the network device and generated by the identified application; and
      monitoring performance of at least one of the identified application in the network and the new traffic generator on the network device, wherein the monitoring of the performance comprises monitoring the performance of the identified application prior to deployment to test one or more of a quality of service associated with the identified application and performance routing associated with the identified application.

10. The network controller of claim 9, wherein the new traffic generator in the virtual container on the network device comprises a full-function traffic generator and replay engine.

11. The network controller of claim 9, wherein the network device comprises one of a network switch and an edge device.

12. The network controller of claim 9, wherein the new traffic generator comprises a stateful and stateless traffic generator.

13. The network controller of claim 9, wherein the identified application associated with the network is one of (1) a future application to be deployed and (2) an existing application on the network.

14. The network controller of claim 11, wherein the network device comprises an access-layer switch.

15. The network controller of claim 9, wherein the new traffic generator is spun-up and deployed based on a chosen application template from a plurality of predetermined known application templates, wherein the chosen application template has characteristics associated with the identified application.

16. The network controller of claim 9, wherein the computer-readable storage device stores additional instructions which, when executed by the processor, causes the processor to perform operations further comprising:
   when the identified application does not have a corresponding signature in a database of application signatures: defining a new application signature associated with the identified application;
   deploying the new traffic generator with the new application signature; and
   testing traffic flow associated with the identified application by running the new traffic generator.

17. A method comprising:
   identifying, via a network controller, an application associated with a network to yield an identified application;

spinning up, by the network controller, a new traffic generator in a virtual container on a network device;

interfacing the new traffic generator in the virtual container to an underlying network device ASIC infrastructure by utilizing a KR port and dedicated on-network-device resources for one or more of a CPU, a memory and a storage; and monitoring a performance of the identified application prior to deployment to test one or more of a quality of service associated with the identified application and performance routing associated with the identified application.

\* \* \* \* \*